United States Patent
Yaguchi et al.

(10) Patent No.: US 7,485,251 B2
(45) Date of Patent: Feb. 3, 2009

(54) METHOD FOR PRODUCING BOTTLE-SHAPED CONTAINER MAINLY MADE OF POLYETHYLENE TEREPHTHALATE RESIN

(75) Inventors: Hiromi Yaguchi, Moka (JP); Tomohiko Ishizuka, Isehara (JP); Daisuke Uesugi, Matsudo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 504 days.

(21) Appl. No.: 10/485,183

(22) PCT Filed: Jul. 31, 2002

(86) PCT No.: PCT/JP02/07785

§ 371 (c)(1),
(2), (4) Date: Jan. 29, 2004

(87) PCT Pub. No.: WO03/011569

PCT Pub. Date: Feb. 13, 2003

(65) Prior Publication Data

US 2004/0173950 A1     Sep. 9, 2004

(30) Foreign Application Priority Data

Jul. 31, 2001    (JP) .............................. 2001-231900

(51) Int. Cl.
*B29C 49/18*  (2006.01)
(52) U.S. Cl. .................. 264/529; 264/530; 264/906
(58) Field of Classification Search ................. 264/529, 264/530, 906
See application file for complete search history.

(56) References Cited

U.S. PATENT DOCUMENTS

| | | | | |
|---|---|---|---|---|
| 3,888,961 A | * | 6/1975 | Schonewald | 264/528 |
| 4,836,971 A | * | 6/1989 | Denis et al. | 264/521 |
| 5,510,079 A | * | 4/1996 | Sugiura et al. | 264/521 |
| 5,540,879 A | * | 7/1996 | Orimoto et al. | 264/526 |
| 5,585,065 A | | 12/1996 | Nakamaki et al. | |
| 5,785,921 A | * | 7/1998 | Outreman et al. | 264/529 |
| 6,090,334 A | | 7/2000 | Matsuno et al. | |

FOREIGN PATENT DOCUMENTS

| | | |
|---|---|---|
| JP | A 02-72929 | 3/1990 |
| JP | A 06-039910 | 2/1994 |
| JP | A 11-227034 | 8/1999 |
| WO | 98/58790 | 12/1998 |

* cited by examiner

*Primary Examiner*—Suzanne E. McDowell
(74) *Attorney, Agent, or Firm*—Oliff & Berridge, PLC

(57) ABSTRACT

A method for producing a bottle-shaped container that is highly thermally resistant and shows an excellent shaping/shape-keeping property in a short period of time is provided. The method for producing the bottle-shaped container mainly made of polyethylene terephthalate comprises the steps of: first biaxially-oriented blow-molding a preform mainly made of polyethylene terephthalate in a first metal mold, to form a primary intermediate molded article; causing thermal contraction of the primary intermediate molded aritcle by heating the primary intermediate molded article, to form a secondary intermediate molded article; and second blow-molding the secondary intermediate molded article in a second metal mold, to form the bottle-shaped container, characterized in that in the second biaxially-oriented blow-molding step, fluid is blown into the secondary intermediate molded article to expand the secondary intermediate article, and then further fluid is blown into and circulated in the expanded article to cool the expanded article.

10 Claims, No Drawings

METHOD FOR PRODUCING BOTTLE-SHAPED CONTAINER MAINLY MADE OF POLYETHYLENE TEREPHTHALATE RESIN

BACKGROUND OF THE INVENTION

This invention relates to a method for producing a bottle mainly made of polyethylene terephthalate (to be referred to as PET hereinafter). More particularly, it relates to a method for producing a bottle mainly made of polyethylene terephthalate that is highly thermally resistant and shows an excellent shaping/shape-keeping property.

PET is being popularly and broadly used for containers for beverage etc., because of its high transparency and mechanical strength. PET containers are normally produced by biaxially-oriented blow-molding.

Biaxially-oriented blow-molding is popularly used for molding beverage bottles and other containers mainly made of PET. When producing a PET container by this method, pressurized fluid, which is typically air, is blown into a preform that has been prepared in advance by injection molding.

In the case of beverage bottles and other containers for containing food, the content filled in the bottle may be heated for sterilization and/or other purposes, so that containers are required to be thermally resistant. To produce a thermally resistant PET container by biaxially-oriented blow-molding, the metal mold is heated to a relatively high temperature between 140 and 150° C., and the molded bottle is heat set in order to raise the thermal resistance of the molded container or bottle.

However, the above described biaxially-oriented blow-molding process may give rise to a shape-keeping problem to the molded container. If the blow-molding process is conducted with a metal mold heated to a temperature level higher than the glass transition temperature (Tg), the molded bottle may produce sinks as the metal mold temperature rises, so that the capacity or the volume of the molded bottle falls or decreases linearly. Particularly, if the temperature of the metal mold is above 110° C., the appearance of the bottle may be remarkably damaged. Thus, there is a demand for a method for producing a bottle that is highly thermally resistant and shows an excellent shaping/shape-keeping property.

Additionally, since bottles mainly made of PET are normally produced on a mass production basis, there is a demand for reducing the producing time.

SUMMARY OF THE INVENTION

Therefore, it is the object of the present invention to provide a method for producing a container, or a bottle, that is highly thermally resistant and shows an excellent shaping/shape-keeping property in a short period of time.

In an aspect of the present invention, the above object is achieved by providing a method for producing a bottle mainly by using PET comprising the steps of:

forming a primary intermediate molded article by primary biaxially-oriented blow-molding, using a preform mainly made of PET and a first metal mold;

forming a secondary intermediate molded article by heating to cause thermal contraction of the primary intermediate molded article; and subjecting the secondary intermediate molded article to secondary blow-molding, using a second metal mold;

the secondary intermediate molded article being expanded by blowing fluid into it and subsequently cooled by causing the fluid to circulate in it in the step of secondary blow-molding.

Preferably, fluid under high pressure is blown into the secondary intermediate molded article for a high pressure blow time of maintaining high pressure to reduce the high pressure blow time.

Preferably, said primary biaxially-oriented blow-molding is realized by blowing fluid under high pressure into the preform for the high pressure blow period of maintaining high pressure to reduce the high pressure blow time.

Preferably, said high pressure blow time is a period of time suitable for providing a good shaping/shape-keeping property.

PREFERRED EMBODIMENTS OF THE INVENTION

According to the invention, firstly a preform is prepared by injection molding of the raw material, which is mainly made of PET. The preform may be prepared by any known method for the purpose of the invention.

For the purpose of the invention, a raw material that is mainly PET may be resin comprising only PET, or resin added or blended with a barrier substance and/or other additives to polyethylene terephthalate. Barrier substances that can be used for the purpose of the invention non-limitatively include polyethylene naphthalate (PEN), methaxylylene diamineadipamide (MXD-6) and ethylene-vinylacetate copolymer (EVOH), although some other known barrier substance may alternatively be used.

Both the raw material and the bottle may have a single-layer structure or a multi-layer structure. For example, a three-layer or five-layer structure formed by using two or more resins selected from PET, a barrier substance, a blend thereof and other substances may be used, although some other structure may alternatively be used.

Then, said preform is biaxially-oriented blow-molded to form a primary intermediary molded article (first biaxially-oriented blow-molding). A known biaxially-oriented blow-molding method may be used for the first biaxially-oriented blow-molding. The preform is heated to temperature (90 to 130° C.) that allows a blow-molding operation to be conducted, and fluid (such as air) under high pressure is blown into the perform, using a first metal mold. The temperature of the first metal mold is preferably between 50 and 230° C.

The known biaxially-oriented blow-molding method may be used for the first blow-molding as described above. In addition, according to the present invention, the high pressure blow time (during which high pressure is maintained in the first biaxially-oriented blow-molding) can be reduced, because the shaping/shape-keeping property of the final product is improved by conducting an operation of circulating air in the second blow-molding step in a manner as described hereinafter and hence the primary intermediate molded article can be prepared even if the fluid under high pressure is blown in a short period of time.

The primary intermediate molded article is made larger than the final product of bottle, and subsequently turned into a secondary intermediate molded article.

The primary intermediate molded article obtained by the first biaxially-oriented blow-molding step is released from the first metal mold, and is heated to 110 to 255° C. to force the primary intermediate molded article to cause thermal contraction of the primary intermediate product to form a secondary intermediate molded article. The heating temperature is preferably higher than the temperature of the first metal mold used for the first biaxially-oriented blow-molding step by 20 to 60° C. As the primary intermediate molded article is heated to such high temperature, the internal stress of the molded product generated in the first biaxially-oriented blow-molding step is alleviated, and the primary intermediate molded article is allowed to thermally contract to turn itself into a secondary intermediate molded article.

The secondary intermediate molded article has dimensions substantially same as or slightly smaller than the final product of the container.

The secondary intermediate molded article obtained as a result of thermal contraction is subjected to a secondary blow-molding step, using a second metal mold heated to 60 to 120° C., to obtain a final product of the container.

In the secondary blow-molding step, air is forced to circulate in the molded product at room temperature in the present invention. More specifically, fluid (air) under high pressure is supplied through the inside of a drawing core shaft to flow into the secondary intermediary blow molded product to produce a final product of bottle as the conventional method. According to the present invention, after the intermediate molded article is expanded by blowing the fluid under high pressure, further fluid such as air is continuously blown into the intermediate molded article, and is forced to circulate in and cool the molded article.

The pressure level required for the air circulation may be slightly lower than the pressure level required for the blow-molding, because it is only necessary to force air to circulate in the molded article. The pressure for the air circulation may be lowered during the air circulation gradually or stepwise. If the air pressure is reduced stepwise, it may be reduced in a single step or in two steps.

The duration of the secondary blow-molding step includes (1) the time necessary for raising the fluid (or air) pressure to a predetermined pressure level for blow-molding (e. g., about 40 MPa), (2) the time necessary for blowing fluid under sustained high pressure for blow-molding, and (3) the time necessary for reducing the pressure and causing fluid to circulate in the molded article. When the pressure is lowered stepwise (in a single step), the duration includes (1) the time necessary for raising the pressure to a predetermined pressure level, (2) the time necessary for blowing fluid under sustained high pressure for blow-molding, and (3) the time necessary for reducing the pressure to an intermediate pressure level (e. g., about 10 to 20 MPa) and causing air to circulate in the molded product (from the time of the start of lowering the pressure level to the time when the sustenance of the intermediary pressure level is terminated).

According to the invention, although the time (3) for air circulation is further required if compared with a conventional process (having no air circulation), the time (2) for blowing fluid under high pressure can be reduced according to the present invention. Thus, according to the present invention, it is possible to reduce the total time necessary for the second blow-molding step. Note that the time (2) necessary for blowing air under high pressure is such that an excellent shaping/shape-keeping property is appropriately obtained for the final product.

The temperature of the second metal mold in the present invnetion does not need to be raised to the high temperature level (140 to 150° C.) like the above described conventional methods in which a biaxially-oriented blow-molding operation is carried out in a single step. In other words, for the purpose of the present invention, the temperature of the second metal mold may be as low as about 105° C. for producing a thermally resistant bottle.

Otherwise, any known conventional blow-molding method may be applied to the second blow-molding step of the method according to the invention.

As described above, according to the invention, it is now possible to produce a container mainly made of PET having highly thermally resistant and showing an excellent shaping/shape-keeping property in a relatively short period of time if compared with the prior art. Presumably, this is because, as fluid (air) is forced to circulate in the second blow-molding step, a convection current of air arises in the molded article in the second metal mold, to cool and harden the inner surface of the molded article so that, as a result, the molded product shows an excellent shaping/shape-keeping property.

Since the molded product shows an excellent shaping/shape-keeping property, the time necessary for blowing fluid (air) under high pressure can be reduced to make it possible to reduce the total time necessary for the second blow-molding step and improve the production efficiency.

Additionally, since the primary intermediate molded article is heated in the heating/contraction step to raise the crystal density and to reduce the internal stress, the molded product is provided with a high thermal resistance. Therefore, a highly thermally resistant container can be produced even if the temperature of the second metal mold used in the second blow-molding step is not raised remarkably. Thus, the time required for raising the temperature of the second metal mold to a predetermined temperature level is reduced along with the time necessary for blowing air under high pressure, to make it possible to produce a bottle that is highly thermally resistant and shows an excellent shaping/shape-keeping property in a reduced period of time.

The method for the present invention is applicable not only to producing beverage bottles but also to producing other containers.

EXAMPLES

In each example and comparative example, 10 bottles were molded as specimens.

Comparative Example 1

Ten performs were prepared by injection molding of PET.

Each of the performs was heated to 110° C. and is biaxially-oriented blow-molded in the first metal mold, to obtain a primary intermediate molded article. The temperature of the first metal mold was 160° C., and the air blowing time was 2.95 seconds as listed in Table 1.

The primary intermediate molded article was taken out of the first metal mold, and heated to 185° C. to be thermally contracted to obtain a secondary intermediate molded article.

The secondary intermediate molded article was heated to 160° C., and blow-molded in a second metal mold, to obtain a final product of bottle. The temperature of the second metal mold was 105° C., the temperature of the air was 25° C., and the air blowing time under high pressure (39 MPa) was 2.85 seconds as listed in Table 1. Further air was not blown to circulate in the secondary blow-molding step in this comparative example.

The obtained 10 final products were observed for total height and capacity, and the averages were calculated. Similarly, the shaping/shape-keeping property of each of the specimens was checked by determining the standard deviation of the total height and that of the capacity of the specimen. The obtained results are summarily shown in Table 1.

The thermal resistance of each of the obtained final products was tested by filling the product with hot water heated to 93° C., hermetically sealing the bottle, showering it with hot water heated to 75° C. for 3 minutes, and by visually observing it for deformation. Table 1 also shows the obtained results.

EXAMPLE 1

The process of Comparative Example 1 was followed except that the time of blowing air under high pressure was reduced in the second blow-molding step and that air was forced to circulate in the intermediate molded article in the secondary blow-molding step. 10 specimens of final products were obtained as in Comparative Example 1.

Air was made to circulate, while reducing the air pressure from a high pressure level (39 MPa) to 25.3 Mpa, maintaining 25.3 Mpa (for 0.2 seconds from the pressure fall to the termination of sustenance of pressure), further reducing the air pressure from 23.5 MPa to 16.6 MPa and maintaining 16.6 MPa (for 0.1 seconds from the pressure fall to the termination of the sustenance of pressure), and subsequently released the air. Thus, the total air circulation time was 0.3 seconds.

The time of blowing air under high pressure in the second blow-molding step, the air circulation time in the second blow-molding step, the shaping/shape-keeping property, and the thermal resistance of the final products are listed in Table 1.

EXAMPLES 2 through 4

In each example, the process of Example 1 was followed except that the time of blowing air under high pressure in the second blow-molding step was modified and the blowing time of the first biaxially-oriented blow-molding step was reduced. 10 specimens of final products were prepared in each example.

The blowing time of the first blow-molding step, the time of blowing air under high pressure in the second blow-molding step, and the air circulation time in the second blow-molding step, the shaping/shape-keeping property and the thermal resistance of the final products are listed in Table 1.

Note that the time of blowing air under high pressure of Example 4 may not be suitable for providing a good shaping/shape-keeping property. Therefore, as far as the time of blowing air under high pressure, Example 4 should be regarded as comparative example.

By comparing Comparative Example 1 and Example 1, it will be seen that the standard deviation of total height is reduced and the standard deviation of capacity is remarkably improved, if air is circulated without changing the total blow time in the secondary blow-molding step even if the high pressure blow time of the second blow-molding step is reduced. Additionally, the thermal resistance was satisfactory.

When the high pressure blow time of the second blow-molding step is further reduced along with the high pressure blow time of the first biaxially-oriented blow-molding step, the shaping/shape-keeping property is improved particularly in terms of total height as seen from the results of Examples 2 and 3. When the parameters of Example 3 are used, the blow time of the first blow-molding step is reduced from 2.20 seconds of Comparatively Example 1 to 1.70 seconds, and the blow time of the second blow-molding step is reduced from 2.10 seconds of the Comparatively Example 1 to 1.60 seconds, to realize an overall time reduction of about 30%.

The shaping/shape-keeping property is also improved when the parameters of Example 4 are used.

As described above in detail, according to the invention, air is made to flow in the molded bottle by forcing air to circulate in the second molding step, to cool the molded bottle from the inside so as to suppress any excessive crystal growth. As a result, the shaping/shape-keeping property of the bottle is improved so that the dimensional variances of products are reduced and the ratio of defective products is minimized to improve the cost performance of bottle producing.

Additionally, the high pressure blow time is reduced to by turn reduce the cycle time of the process of molding a perform and producing a bottle as final product and hence improve the productivity.

What is claimed is:
1. A method for producing a bottle-shaped container mainly made of polyethylene terephthalate, comprising the steps of: first biaxially-oriented blow-molding a preform mainly made of polyethylene terephthalate in a first metal mold, to form a primary intermediate molded article, causing thermal contraction of the primary intermediate molded article by heating the primary intermediate molded article, to form a secondary intermediate molded article, and second blow-molding the secondary intermediate molded article in a

TABLE 1

| | Blow time in first blow-molding | Blow time in second blow-moldin | | | Shaping/shape-keeping property (total height) | | Shaping/shape-keeping property (capacity or volume) | | |
|---|---|---|---|---|---|---|---|---|---|
| | | under high pressure | air circulation | total | average | standard deviation | average | standard deviation | Thermal resistance |
| Com. Ex. 1 | 2.95 sec. | 2.85 sec. | none | 2.85 sec. | 253.18 mm | 0.20 | 914.09 ml | 3.46 | no deformation |
| Ex. 1 | 2.95 sec. | 2.55 sec. | 0.3 sec. | 2.85 sec. | 253.14 mm | 0.12 | 924.82 ml | 1.09 | no deformation |
| Ex. 2 | 2.20 sec. (−0.75 sec.) | 1.80 sec. | 0.3 sec. | 2.10 sec. (−0.75 sec.) | 253.07 mm | 0.07 | 921.16 ml | 1.33 | no deformation |
| Ex. 3 | 1.70 sec. (−1.25 sec.) | 1.30 sec. | 0.3 sec. | 1.60 sec. (−1.25 sec.) | 253.07 mm | 0.09 | 918.58 ml | 1.53 | no deformation |
| Ex. 4 | 1.45 sec. (−1.50 sec.) | 1.05 sec. | 0.3 sec. | 1.35 sec. (−1.50 sec.) | 253.01 mm | 0.07 | 919.59 ml | 2.03 | no deformation | second metal mold, to form the bottle-shaped container, characterized in that in the second biaxially-oriented blow-molding step, fluid under high pressure is blown into the secondary intermediate molded article to expand the secondary intermediate article, and then further fluid is blown into and circulated in the expanded article to cool the expanded article, so as to minimize the high pressure blow time.

2. The method according to claim 1, wherein said first biaxially-oriented blow-molding is realized by blowing fluid under high pressure into the preform so as to minimize the high pressure blow time.

3. The method according to claim 1, wherein said high pressure blow time is a period of time suitable for providing a good shaping/shape-keeping property.

4. The method according to claim 1, wherein said high pressure blow time is a period of time suitable for providing a good shaping/shape-keeping property.

5. The method according to claim 1, wherein high pressure is greater than 20 Mpa.

6. The method according to claim 1, wherein high pressure is greater than 25.3 Mpa.

7. A method for producing a bottle-shaped container mainly made of polyethylene terephthalate, comprising the steps of: first biaxially-oriented blow-molding a preform mainly made of polyethylene terephthalate in a first metal mold, to form a primary intermediate molded article, causing thermal contraction of the primary intermediate molded article by heating the primary intermediate molded article, to form a secondary intermediate molded article, and second blow-molding the secondary intermediate molded article in a second metal mold, to form the bottle-shaped container, characterized in that in the second biaxially-oriented blow-molding step, fluid is blown into the secondary intermediate molded article to expand the secondary intermediate article, and further fluid is blown into and circulated in the expanded article;

wherein said first biaxially-oriented blow-molding is realized by blowing fluid under high pressure into the preform so as to minimize the high pressure blow time.

8. The method according to claim 7, wherein said high pressure blow time is a period of time suitable for providing a good shaping/shape-keeping property.

9. The method according to claim 7, wherein high pressure is greater than 20 MPa.

10. The method according to claim 1, wherein high pressure is greater than 25.3 MPa.

* * * * *